(12) United States Patent
Farahbod-Sternahl et al.

(10) Patent No.: US 11,654,485 B2
(45) Date of Patent: May 23, 2023

(54) METHOD, DEVICE AND POWDER FOR THE ADDITIVE MANUFACTURING OF A COMPONENT WITH OXIDE DISPERSION STRENGTHENING AND CORRESPONDING COMPONENT

(71) Applicant: Siemens Aktiengesellschaft, Munich (DE)

(72) Inventors: Lena Farahbod-Sternahl, Hannover (DE); Christian Felsmann, Panketal (DE); Dennis Glass, Berlin (DE); Jacek Grodzki, Potsdam (DE); Robert Herfurth, Bernau bei Berlin (DE); Lars Hoefener, Berlin (DE); Bernd Hornung, Riedlingen (DE); David Rule, Hamburg (DE); Tobias Thomas Rühmer, Radeberg (DE); Eric Thomas, Oranienburg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 96 days.

(21) Appl. No.: 17/044,820

(22) PCT Filed: Apr. 17, 2019

(86) PCT No.: PCT/EP2019/059881
§ 371 (c)(1),
(2) Date: Oct. 1, 2020

(87) PCT Pub. No.: WO2019/214917
PCT Pub. Date: Nov. 14, 2019

(65) Prior Publication Data
US 2021/0094101 A1  Apr. 1, 2021

(30) Foreign Application Priority Data

May 9, 2018 (DE) .................... 10 2018 207 248.5

(51) Int. Cl.
*B22F 5/04* (2006.01)
*B33Y 10/00* (2015.01)
(Continued)

(52) U.S. Cl.
CPC ................ *B22F 5/04* (2013.01); *B22F 10/28* (2021.01); *B22F 10/364* (2021.01); *B22F 10/38* (2021.01);
(Continued)

(58) Field of Classification Search
CPC . C22C 1/0433; C22C 32/001; C22C 32/0026; B22F 7/06; B22F 10/64;
(Continued)

(56) References Cited

U.S. PATENT DOCUMENTS

| | | |
|---|---|---|
| 2013/0199013 A1 | 8/2013 | Graichen |
| 2014/0242400 A1 | 8/2014 | Hoebel et al. |

(Continued)

FOREIGN PATENT DOCUMENTS

| | | |
|---|---|---|
| CN | 103008657 A | 4/2013 |
| CN | 106048275 A | 10/2016 |

(Continued)

OTHER PUBLICATIONS

Min Zheng et al: "Fabrication and Characterization of Additive Manufactured Nickel-Based Oxide Dispersion Strengthened Coating Layer for High-Temperature Application", Journal of Engineering for Gas Turbines and Power, vol. 140, No. 6, pp. 62101-1, XP009510979, ASME, New York, NY, US ISSN: 0742-4795, DOI: 10.1115/1.4038351; Abstract, table 1, Figure 10; Oxide Dispersion Strengthened Coating Layer Fabrication; 2018.
(Continued)

*Primary Examiner* — Moshe Wilensky

(57) ABSTRACT

A method for the additive manufacturing of a component includes providing a powdered base material for a compo-
(Continued)

nent, in particular a component for the hot gas path of a gas turbine, building up the component layer by layer on a building platform by fusing individual layers of the base material, and introducing an oxide dispersion strengthening into a region of the component to be additively manufactured by an oxidic additive, wherein the region is usually exposed to high thermomechanical loading during operation of the component.

7 Claims, 2 Drawing Sheets

(51) Int. Cl.
| | |
|---|---|
| *B33Y 70/00* | (2020.01) |
| *B33Y 80/00* | (2015.01) |
| *B23K 26/342* | (2014.01) |
| *B22F 10/50* | (2021.01) |
| *B22F 10/28* | (2021.01) |
| *F01D 5/28* | (2006.01) |
| *B22F 10/364* | (2021.01) |
| *B22F 10/38* | (2021.01) |
| *B23K 101/00* | (2006.01) |
| *B22F 10/36* | (2021.01) |
| *B22F 10/64* | (2021.01) |

(52) U.S. Cl.
CPC ............ *B22F 10/50* (2021.01); *B23K 26/342* (2015.10); *B33Y 10/00* (2014.12); *B33Y 70/00* (2014.12); *B33Y 80/00* (2014.12); *F01D 5/286* (2013.01); *B22F 10/36* (2021.01); *B22F 10/64* (2021.01); *B22F 2301/15* (2013.01); *B23K 2101/001* (2018.08); *F05D 2220/32* (2013.01); *F05D 2230/31* (2013.01); *F05D 2300/175* (2013.01)

(58) Field of Classification Search
CPC .. B22F 5/04; B22F 10/50; B22F 10/20; B22F 10/36; B22F 10/364; B22F 10/28; F01D 5/286; B33Y 70/00; B33Y 80/00; B33Y 10/00; B23K 26/342; B23K 2101/001
See application file for complete search history.

(56) References Cited

U.S. PATENT DOCUMENTS

| | | |
|---|---|---|
| 2015/0044084 A1 | 2/2015 | Hofmann et al. |
| 2015/0093279 A1 | 4/2015 | Kington et al. |
| 2015/0198052 A1 | 7/2015 | Pavlov et al. |
| 2015/0275334 A1 | 10/2015 | Helander et al. |
| 2017/0120331 A1 | 5/2017 | Ishida et al. |
| 2017/0209923 A1 | 7/2017 | Giovannetti et al. |
| 2018/0056396 A1 | 3/2018 | Menon et al. |
| 2020/0157951 A1 | 5/2020 | Tham et al. |

FOREIGN PATENT DOCUMENTS

| | | |
|---|---|---|
| DE | 102007029052 A1 | 1/2009 |
| EP | 2601006 A1 | 6/2013 |
| EP | 2893994 A1 | 7/2015 |
| EP | 3162473 A1 | 5/2017 |
| EP | 3222372 A1 | 9/2017 |
| EP | 3290135 A1 | 3/2018 |
| WO | 2012/016836 A1 | 2/2012 |
| WO | 2017162445 A1 | 9/2017 |
| WO | 2018222326 A1 | 12/2018 |

OTHER PUBLICATIONS

Min Zheng et al: "Fabrication and characterization of additive manufactured nickel-based ODS coating layer for high temperature application", Database Compendex [Online] Engineering Information, Inc., New York, NY, US; 2017, XP002791888, Database accession No. E20173704155798; Abstract.

PCT International Search Report and Written Opinion of International Searching Authority dated Mar. 7, 2019 corresponding to PCT International Application No. PCT/EP2019/059881 filed Apr. 17, 2019.

METHOD, DEVICE AND POWDER FOR THE ADDITIVE MANUFACTURING OF A COMPONENT WITH OXIDE DISPERSION STRENGTHENING AND CORRESPONDING COMPONENT

CROSS REFERENCE TO RELATED APPLICATIONS

This application is the US National Stage of International Application No. PCT/EP2019/059881 filed 17 Apr. 2019, and claims the benefit thereof. The International Application claims the benefit of German Application No. DE 10 2018 207 248.5 filed 9 May 2018. All of the applications are incorporated by reference herein in their entirety.

FIELD OF INVENTION

The present invention relates to a process for the additive manufacture of a component having a region which contains oxidic dispersion strengthening. Furthermore, a corresponding component, a pulverulent starting material or powder for the additive manufacture of the component and a corresponding additive manufacturing apparatus are provided.

The component is advantageously intended for use in a turbo machine, advantageously in the hot gas path of a gas turbine. The component advantageously comprises a nickel- or cobalt-based superalloy as main constituent.

BACKGROUND OF INVENTION

Generative or additive manufacturing processes comprise, for example as powder bed process, selective laser melting (SLM) or laser sintering (SLS), or electron beam melting (EBM). Laser metal deposition (LMD) is likewise among additive processes.

A process for selective laser melting is, for example, known from EP 2 601 006 B.

Additive manufacturing processes have been found to be particularly advantageous for complex or complicated or finely structured components, for example labyrinth-like structures, cooling structures and/or lightweight structures. In particular, additive manufacturing is advantageous as a result of a particularly short chain of process steps since a production or manufacturing step for a component can be carried out on the basis of a corresponding CAD file.

Furthermore, additive manufacturing is particularly advantageous for the development or production of prototypes which cannot be produced, or cannot be produced efficiently, by means of conventional subtractive or cutting machining methods or casting technology.

Apart from "prototyping", efforts are being made also to employ additive manufacturing for the commercial production of highly thermally and/or mechanically stressed components of turbo machines, for example components which are employed in the hot gas path of a gas turbine, including turboshaft engines and jet turbines.

Turbine guide vanes and rotor blades in the hot gas path are usually made of highly heat resistant nickel- or cobalt-based superalloys. The production route via generative manufacturing processes, comprising laser beam melting, electron beam melting or laser metal deposition, still presents many difficulties which exclude the use of these methods, especially in the case of rotating or highly stressed blades.

The process-related rapid cooling rates of the welding process involved generally lead to a very fine grain structure which is characterized by a low resistance to grain boundary slipping and thus comparatively poor creep properties at relatively high temperatures. Although at low temperatures finer grains or a structure having a comparatively small grain size is superior in respect of its strength, a very fine microstructure or crystal structure is not damage-tolerant and leads to comparatively high crack propagation speeds.

When high-strength, precipitation hardened γ/γ' alloys are used, formation of warm, hot or remelting cracks disadvantageously occurs. For this reason, blades for gas turbines have hitherto usually not been additively manufactured but have been made exclusively by precision casting. However, precision casting brings with it disadvantages of very expensive and complicated provision of the tools required and thus leads to long process times and further production-related design restrictions for the blades.

SUMMARY OF INVENTION

It is therefore an object of the present invention to provide means which can at least partially solve the abovementioned problems and in particular can use additive processes for the production of hot gas components of turbines, in particular turbine blades. The use of large proportions of γ or γ' phase precipitates, advantageously γ' phase precipitates, in highly stressed regions of the components lacking weldability can advantageously be avoided, and an alternative possibility for structural strengthening or increasing the local strength can be proposed.

This object is achieved by the subject matter of the independent claims. Advantageous embodiments are subject matter of the dependent claims.

One aspect of the present invention relates to a process for the additive manufacture of a component, comprising provision of a pulverulent base material for the component. The component is, in particular, a component which has been designed for the hot gas path of a gas turbine, for example a turbine guide vane or rotor blade.

The base material can describe a first powder.

The process further comprises the layerwise buildup of the component on a building platform by solidification of individual layers of the base material.

In one embodiment, the base material comprises one of the following materials: PWA795, Mer172, MAR-509, Stellite-31, Hastelloy X, Haynes 230, Haynes 625, IN939, IN738, IN713, IN792, IN718, Alloy 247, Rene 80 or other nickel- or cobalt-based superalloys.

The process further comprises the introduction or formation of oxidic dispersion strengthening (oxide dispersion strengthening) into or in a region of the additively manufactured component by means of an oxidic additive. The additive advantageously consists of, in particular, micron-sized and/or nanosize particles.

The region which is correspondingly structurally strengthened by dispersion hardening is usually subjected to high thermomechanical stress during operation of the component. This is intended to mean that during operation of the component the region is, in particular, subjected to higher thermal and/or mechanical stress than other parts or regions of the component which, for example, are at a distance from said region, for example internal regions of the blades.

For the present purposes, the term dispersion hardening or strengthening advantageously refers to precipitation hardening by means of particles, usually oxidic compounds, which are stable up to the melting point of the material. A hardened structure of the finished component is in this sense effected by the introduced oxidic particles or additives having to be circumvented by, for example nonshearable, dislocations or dislocation movements brought about by external influences. For example, dispersion hardening can increase the possible use temperatures of the component, in contrast to a standard use, because the precipitates do not dissolve or dissolve to a lesser extent at higher temperatures than, for instance, the γ' phase. Furthermore, dispersion hardening can improve the long-term stability of the component.

The process described enables, as indicated above, hardening of the corresponding components advantageously to be carried out in a tailored manner in particularly highly stressed regions. At the same time, the problem of lack of weldability of base materials having a high proportion of γ or γ' phase, advantageously proportion of γ' phase, can be circumvented by more readily weldable base materials (see above) being employed. The solution described is also economically advantageous since the design degrees of freedom of this technology can be exploited by the additive process steps and the long process times of the cast components can be circumvented.

In one embodiment, the component is a turbine blade, for example a guide vane or rotor blade, and the region is a surface region of the turbine blade.

The expression "surface region" is for the present purposes intended to mean that the corresponding region is advantageously in contact with a surface of the component but can also extend into an interior of the structure of the component. Accordingly, the region is usually particularly highly stressed both mechanically and thermally when the component is used in the hot gas path of the gas turbine. The region can also refer to a tip or end region of the component.

In one embodiment, the region describes or encompasses a leading edge, profile nose or entry edge of the turbine blade.

In one embodiment, the region describes or encompasses a trailing edge or exit edge of the turbine blade.

In one embodiment, the region describes or encompasses a tip region of the turbine blade.

In one embodiment, the introduction of the strengthening occurs layerwise, i.e. the component is at least partially built up layerwise alternately of the base material and a mixture of the base material and the oxidic additive for formation of the oxidic dispersion strengthening. In this way, the strengthening can be particularly readily introduced locally in a metered manner and/or in a tailored manner into the structure of the component. In this embodiment, the region can also be an interior region of the component.

In one embodiment, the region is a surface region and a region or subregion of the component which is located, starting out from the surface region, further below or in the interior is firstly built up from the base material with the region subsequently being built up from a mixture of the base material and the oxidic additive for forming the oxidic dispersion strengthening. According to this embodiment, the component can be provided particularly economically with the strengthening only at the places which are particularly highly stressed thermally and/or mechanically, in particular at the component surface.

The abovementioned additive can describe a second powder.

In one embodiment, the process encompasses the prevention of excessive agglomeration or flotation of the oxidic additive during the additive buildup of the component, i.e. the actual welding process, by means of shortened energy inputs and/or increased cooling or solidification rates.

For the present purposes, the expressions "shortened energy inputs" and "increased" cooling rates are intended to mean that the corresponding energy inputs or cooling rates are shortened or increased compared to a, for example, fixed, customary or standard process. For example, an energy input can be reduced or shortened by pulsing of the corresponding energy beam (laser beam). On the other hand, the cooling rate of a melt bath can be increased by employing coolants or cooling methods known to a person skilled in the art.

In one embodiment, the process comprises the layerwise formation of oriented solidification or (re)crystallization along a longitudinal axis of the region, for example by renewed remelting of a previously solidified component layer and/or epitactic "growing-on" of one or more subsequent layers and/or by means of a suitable thermal treatment, solution heat treatment or recrystallization heat treatment.

The abovementioned oriented (re)crystallization or oriented solidification is advantageously characterized by an oriented grain or crystal structure, for example a rod-like crystalline structure, columnar structure or single-crystal structure. This embodiment makes it possible to reduce, in an advantageous manner, a modulus of elasticity along the longitudinal axis of the component or of the region and thus improve a cyclic stress resistance of the component and/or of the region and avoid fatigue or deformation ("low/high cycle fatigue/-thermomechanical fatigue").

A further aspect of the present invention relates to a component which can be produced or has been produced by the process described. The component also comprises the oxide-dispersion-strengthened or oxide-dispersion-hardened region and a further region composed of a superalloy, advantageously a readily weldable nickel- or cobalt-based superalloy. In this context, "readily" means that the corresponding material has little susceptibility to hot cracks or warm cracks and can be built up additively at comparatively high buildup rates.

The abovementioned alloy is advantageously the product of the additive buildup, melting-on or welding of the abovementioned base material, so that weldability and/or stoichiometry can relate synonymously to the base material or the superalloy mentioned.

In one embodiment, the component comprises, along a longitudinal axis of the oxide-dispersion-strengthened region, a single-crystal or directionally solidified or columnar grain or crystal structure having a grain aspect ratio of at least 10:1. This advantageously makes it possible, as indicated above, to reduce the modulus of elasticity along the longitudinal axis of the component or of the region and thus, for example, improve the cyclic stress resistance of the component in the region. Advantages which accordingly relate to the oriented solidification during buildup or the oriented recrystallization after the additive buildup can also concern the finished additively built up structure of the region, and vice versa.

A further aspect of the present invention relates to a powder for additive manufacture, in particular selective laser melting, comprising the pulverulent base material composed of a nickel- or cobalt-based superalloy and an oxidic additive which is present, advantageously homogeneously distributed in the base material and is suitable for forming oxidic dispersion strengthening in the region of the component during additive manufacture.

The powder can be produced by means of mechanical alloying as per the prior art.

In one embodiment, the additive comprises yttrium oxide, advantageously $Y_2O_3$, or hafnium oxide, advantageously $HfO_2$, as nanoparticles in a concentration in the range from 0.5 to 2 percent by volume.

In one embodiment, the additive comprises yttrium oxide, advantageously $Y_2O_3$, and hafnium oxide, advantageously $HfO_2$, as nanoparticles in a concentration in the range from 0.5 to 2 percent by volume.

The proportion of hafnium oxide leads, owing to its low diffusivity, to an advantageously low particle agglomeration rate.

Corresponding yttrium (oxide) is significantly cheaper compared to hafnium (oxide) and is therefore likewise advantageous.

In one embodiment, the additive comprises hafnium (Hf), tantalum (Ta), zirconium (Zr), titanium (Ti) and/or elements from the group of the lanthanides as oxide formers. These elements can be advantageous as oxide formers since they are mixtures.

In one embodiment, the additive comprises aluminum (Al), barium (Ba), potassium (K), strontium (Sr) or niobium (Nb) and/or elements from the group of the lanthanides as oxide formers. These elements can, as oxide formers, likewise be provided, for example in a mixture with the above-mentioned oxide formers.

In one embodiment, the additive advantageously has specific contents of hafnium, tantalum, zirconium and/or titanium as oxide formers in order to introduce, corresponding to the bonding enthalpies, lesser amounts of warm crack-promoting elements, e.g. as a result of oxide dissolution, into the base material.

Further elements which are not mentioned as oxide formers are, owing to possible disturbances of the stoichiometry of the powder overall, less advantageous and should at most be used in relatively small amounts.

In one embodiment, the additive is present (in the powder) in amounts which result in a concentration of the additive in the range from 0.1 to 5 percent by volume in the powder. These figures can in the present case relate to the oxide-forming elements of the described embodiments individually or in total.

A further aspect of the present invention relates to an apparatus for the additive manufacture of the component, advantageously by the powder bed process, comprising first means for applying a first pulverulent material in particular the base material, and second means for applying a second pulverulent material which is different from the first material, in particular the oxidic additive, wherein the apparatus is additionally configured for preventing mixing of the first material and the second material in corresponding stock vessels for the materials before the additive buildup of the component, in particular in a buildup volume of the apparatus. The first means can comprise a first stock vessel. The second means can comprise a second stock vessel.

Embodiments, features and/or advantages which relate in the present case to the process or the correspondingly produced component can also concern the powder and the apparatus, or vice versa.

BRIEF DESCRIPTION OF THE DRAWINGS

Further details of the invention will be described below with the aid of the figures.

DETAILED DESCRIPTION OF INVENTION

In the working examples and figures, identical elements or elements having the same effect can in each case be denoted by the same reference symbols. The elements depicted and their relative sizes are in principle not to be considered to be true to scale; rather, individual elements can be depicted with exaggerated thickness or large dimensions in the interest of better presentation and/or to give a better understanding.

Figure 1:
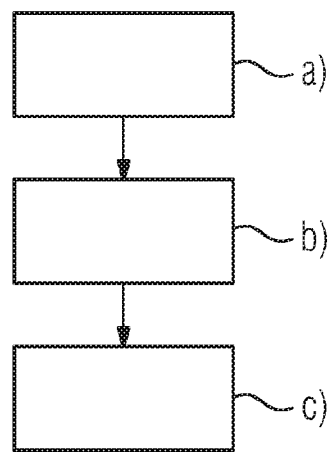
FIG. 1 shows a schematic flow diagram with process steps according to the invention.

FIG. 1 indicates process steps according to the invention with the aid of a schematic flow diagram. The process is suitable for the additive manufacture of a component, in particular a component which is used in the hot gas path of a gas turbine.

The process comprises the provision a) of a pulverulent base material P1 for the component 10, which will be described in more detail below with the aid of FIG. 2.

The process further comprises the layerwise buildup b) of the component 10 on a building platform 1 by solidification of individual layers S of the base material P1. This process step is likewise described in more detail by FIG. 2 (see below).

The process further comprises introduction of oxidic dispersion strengthening c) into a region B of the additively manufactured component 10 by means of an oxidic additive, where the region B is usually subjected to high thermomechanical stress during operation of the component 10.

Furthermore, the component 10 can be a rotor blade or guide vane or an airfoil thereof, a segment or ring segment, a burner part of a burner tip, a frame, a shield, a nozzle, seal, a filter, an opening or lance, a resonator, stamp or a swirler, or a corresponding transition, insert or a corresponding retrofitted part.

Figure 2:
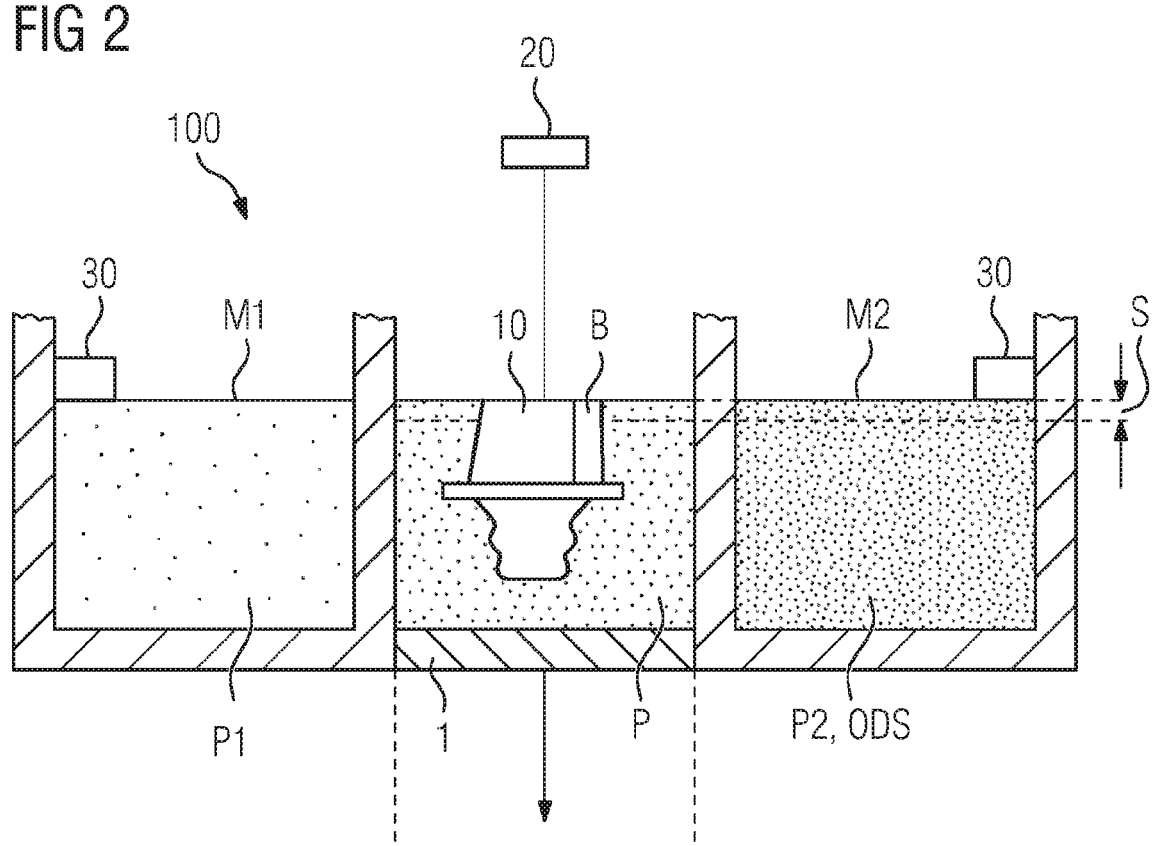
FIG. 2 shows a schematic sectional view of an apparatus or an additive manufacturing plant.

FIG. 2 indicates, with the aid of a schematic sectional view, an apparatus 100 for producing the component 10. Process steps according to the invention are likewise illustrated. The apparatus 100 comprises a building platform 1. Above the building platform 1, a powder bed in which the component 10, in particular a turbine blade, is arranged and has already been partially solidified or built up in the course of the additive manufacture thereof is arranged in a construction space (not explicitly labeled). In particular, it is indicated that a layer S for a blade airfoil of the component 10 is selectively solidified by means of an irradiation device 20 which can, for example, comprise a laser beam source or electron beam source. After successful selective solidification, the building platform 1 is usually lowered by a distance corresponding to the layer thickness S and a fresh powder layer is applied, for example by means of the coating device 30 shown.

The apparatus 100 comprises a first means M1 for applying a first pulverulent material P1. The means M1 advantageously designates a (stock) vessel for a base material, in particular a first powder P1, and a coating device 30 by means of which the powder P1 can be conveyed into the construction space (layerwise).

The apparatus further comprises a second means M2 for applying a second pulverulent material P2 which is different from the first material. The means M2 advantageously likewise designates a (stock) vessel in which a second powder P2, in particular comprising or being an oxidic additive for forming the oxidic dispersion strengthening, is arranged, and also a corresponding coating device 30.

In a manner analogous to the first means M1, the coating device 30 can advantageously convey a particular dosage of the powder P2 into the construction space, so that, for example, a mixture of the first powder P1 and the second powder P2 can be employed for the additive manufacture of the component 10. Said mixture, containing the first powder P1 and the second powder P2, is advantageously a (hybrid) powder which in the following is denoted by the reference symbol P.

The apparatus 100 is also configured so that mixing of the first material P1 and the second material P2 in corresponding stock vessels for the materials P1 and P2 before the additive buildup of the component 10 and advantageously outside the construction space (cf. middle section of FIG. 1) is prevented.

The first powder P1 advantageously represents a base material or main constituent for the component 10. This base material can, in particular, contain one or more of the following materials: PWA795, Mer172, MAR-509, Stellite-31, Hastelloy X, Haynes 230, Haynes 625, IN939, IN738, IN713, IN792, IN718, Alloy 247, Rene 80 or other nickel- or cobalt-based superalloys.

The second powder P2 advantageously likewise comprises a base material such as PWA795, Mer172, MAR-509, Stellite-31, Hastelloy X, Haynes 230, Haynes 625, IN939, IN738, IN713, IN792, IN718, Alloy 247 or Rene 80. The second powder P2 can advantageously further comprise an oxidic additive (cf. ODS) and is suitable for forming oxidic dispersion strengthening (oxide dispersion strengthening or ODS) in a region B of the component 10 during the additive manufacture of the component 10. The second powder P2 can, for example, contain from 0.5 to 2 percent by volume of the additive ODS.

The second powder P2 or the additive ODS can comprise hafnium (Hf), tantalum (Ta), zirconium (Zr), titanium (Ti) or elements from the group of the lanthanides as oxide formers.

In one embodiment, the additive comprises yttrium oxide, advantageously $Y_2O_3$, or hafnium oxide, advantageously $HfO_2$, as nanoparticles in a concentration in the range from 0.5 to 2 percent by volume.

In a further embodiment, the additive comprises yttrium oxide, advantageously $Y_2O_3$, and hafnium oxide, advantageously $HfO_2$, as nanoparticles in a concentration in the range from 0.5 to 2 percent by volume.

In a further embodiment, the additive comprises aluminum (Al), barium (Ba), potassium (K), strontium (Sr) or niobium (Nb) or elements from the group of the lanthanides as oxide formers.

Differently from what is shown in FIG. 2, the stock vessel (at right) which keeps the second powder P2 in stock can be made smaller than that which keeps the first powder P1 in stock.

The second powder P2 or the additive ODS can also be present in an inert matrix or in a carrier in the corresponding stock vessel, so that the required concentration in the powder P can more easily be set.

The (hybrid) powder P, containing the above-described first powder P1 and second powder P2, is advantageously provided and suitable for additive manufacture, in particular selective laser melting or electron beam melting. This can mean that it is particularly suitable in terms of its particle size distribution and particle shape, for example spherical, for the selective melting processes.

In a further embodiment, the additive is present in the powder in amounts which result in a concentration of the additive of from 0.1 to 5 percent by volume in the powder.

Furthermore, although the second powder P2 is present in a significantly lower concentration in the first powder P1 or powder P, it can nevertheless advantageously be distributed approximately homogeneously in this. This can, for example, be made possible by layers S having a thickness of only from 20 to 40 µm of the first powder P1 and of the second powder P2 for strengthening of the region B being applied alternately during the additive buildup of the component 10 and subsequently being irradiated and solidified. Accordingly, the introduction of the reinforcement can be carried out layerwise, as already indicated above with the aid of FIG. 2.

In order to prevent excessive agglomeration or flotation of the second powder P2 or of the oxidic additive ODS in the first powder or the base material during the additive buildup of the component 10 during the course of the inventive process described, it is possible to use shortened energy inputs and/or increased cooling rates compared to a standard process, so that the strengthening is introduced very advantageously and homogeneously.

Furthermore, layerwise recrystallization, for example of a previously solidified/built up component layer S, can be effected during the course of the process of the invention (cf. FIG. 4 below). This is made possible according to the invention by, for example, a previous structurally present component layer being remelted by means of an energy beam using the irradiation device 20 and/or, for example, being thermally treated by means of recrystallization heat treatment along a longitudinal axis LA (cf. FIG. 4) of the region B, which can correspond to a buildup direction (cf. for example, the vertically ascending direction in FIG. 2). This process differs, for example, from a static heat treatment in that a heat source is conveyed in a targeted manner through the component or around the component, so that a "hot zone" effectively moves through the component. A particularly high grain aspect ratio in the crystal structure of the region B can advantageously be formed by the recrystallization described.

Figure 3:
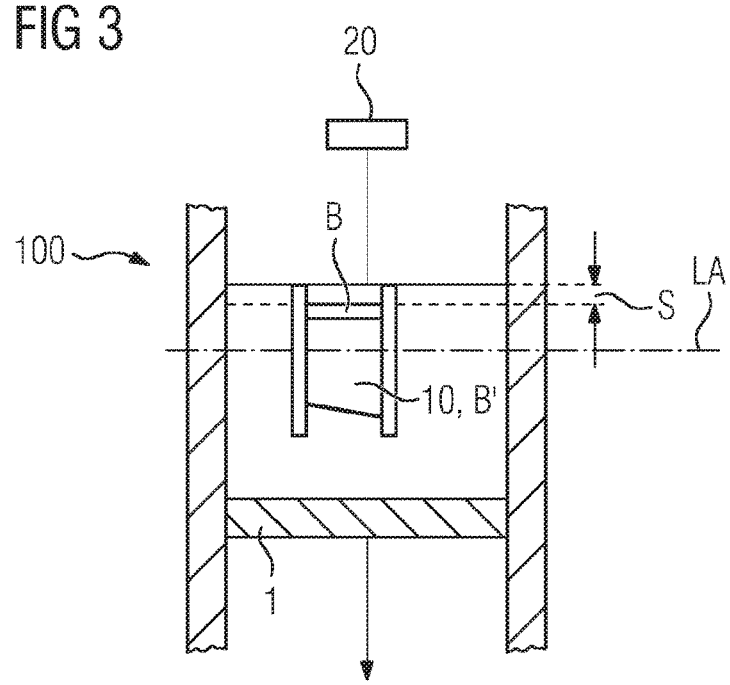
FIG. 3 shows a schematic sectional view analogous to FIG. 2, in which a component is additively built up according to an embodiment which is alternative to FIG. 2.

FIG. 3 shows an alternative embodiment of the above-described process with the aid of a schematic sectional view of the apparatus 100. In contrast to FIG. 2, which shows an apparatus 100 having separate stocking of the first powder P1 and of the second powder P2, the apparatus shown in FIG. 3 can be a conventional apparatus.

The component 10 is advantageously a guide vane of a turbine.

The component 10 advantageously has not only the region B provided with the oxidic dispersion strengthening but also a conventional region in which no oxidic dispersion strengthening has been introduced by the process described but which is instead a conventional region which has, for example, been built up additively only from the base material (cf. first powder P1).

Furthermore, as a difference from FIG. 2, the component 10 has been arranged, for example, rotated about its longitudinal axis LA by 90° in the powder bed. This arrangement makes it possible firstly to build up the component 10 or the region from only the base material (cf. first powder P1) and subsequently place it in the apparatus 100 again and fill the latter with the second powder P2 in order to provide localized surface regions of the component 10 with the oxidic dispersion strengthening or introduce the latter.

The abovementioned areas or regions are advantageously regions which are particularly highly stressed thermally and/or mechanically and have to be structurally strengthened for operation of the component. Accordingly, the region B of the component 10 can be a surface region, with a subregion B' of the component 10 being located further underneath or in the interior and supporting the region B.

Figure 4:
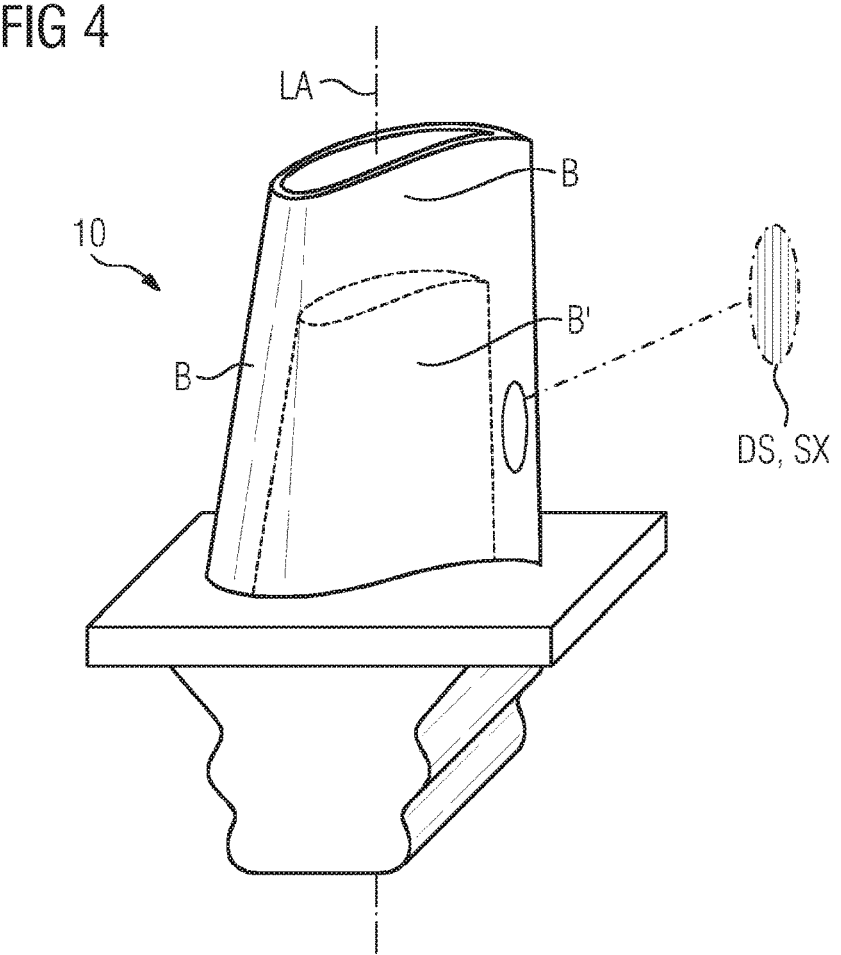
FIG. 4 shows a schematic side view of a turbine blade having a detailed enlarged region (at right).

FIG. 4 schematically shows a component 10 which can be produced or has been produced by the process described. The component 10 is, in contrast to that of FIG. 3, a rotor blade of a turbine. The component 10 accordingly has (as described) the oxide dispersion strengthened region B and the further region B', advantageously composed of a (readily) weldable nickel- or cobalt-based superalloy (see above). The two regions are part of a blade airfoil of the component 10. However, it can in particular situations also be advantageous to provide, for example, a blade foot (not explicitly indicated) of the turbine blade shown or quite different components provided in the hot gas path of turbines or other machines with the dispersion strengthening.

It can also be seen in FIG. 4 that the strengthened region B has been provided at a leading edge (at left), a trailing edge (at right) and at a blade airfoil tip (cf. upper region of the component 10 in FIG. 4) by introduction of the dispersion strengthening.

It can also be seen in FIG. 4 that the region B of the component 10 has a single-crystal SX and/or directionally solidified DS or rod-like crystalline or columnar grain or crystal structure. A corresponding grain aspect ratio of the directionally solidified rods, grains or crystallites is advantageously 10:1 or more, for example along a longitudinal axis LA of the oxide dispersion strengthened region B. Said grain aspect ratio is, as described above, advantageously formed by a recrystallization being carried out layerwise so that the corresponding rods or grains extend over a plurality of component layers, for example over lengths of 100-200 μm or more, while grain dimensions or particle dimensions of individual grains of the base material are significantly smaller, for example in the diameter range from 20 to 40 μm.

The invention is not restricted to the description of the working examples but instead encompasses each novel feature and any combination of features. This includes, in particular, any combination of features in the claims, even when this feature or this combination is itself not explicitly indicated in the claims or working examples.

The invention claimed is:

1. A process for additive manufacture of a component, comprising:
   providing a pulverulent base material for the component,
   layerwise building up of the component on a building platform by solidification of individual layers of the base material, and
   introducing oxidic dispersion strengthening into a region of the additively manufactured component by an oxidic additive, where the region is usually subjected to high thermomechanical stress during operation of the component
   wherein the introducing of the oxidic dispersion strengthening is carried out layerwise, by the component being built up at least partially layerwise alternately from the base material and a mixture of the base material and the oxidic additive for formation of the oxidic dispersion strengthening.

2. The process as claimed in claim 1, wherein the base material comprises one of the following materials: PWA795, Mer172, MAR-509, Stellite-31, Hastelloy X, Haynes 230, Haynes 625, IN939, IN738, IN713, IN792, IN718, Alloy 247 and Rene 80.

3. The process as claimed in claim 1, wherein the component is a turbine blade and the region describes a surface region of the turbine blade, and/or a trailing edge of the turbine blade.

4. The process as claimed in claim 1, wherein the region is a surface region and a subregion of the compenent located underneath or in an interior is firstly built up from the base material and the region is subsequently built up from a mixture of the base material and the oxidic additive for formation of the oxidic dispersion strengthening.

5. The process as claimed in claim 1, further comprising: reducing agglomeration or flotation of the oxidic additive during the layerwise building up of the component by modifying energy inputs and/or cooling rates.

6. The process as claimed in claim 1, further comprising: layerwise forming of oriented recrystallization along a longitudinal axis of the region, by renewed remelting of a previously solidified component layer and/or by means of a thermal treatment.

7. The process as claimed in claim 1, wherein the component comprises a component for a hot gas path of a gas turbine.

* * * * *